(12) United States Patent
Barbour

(10) Patent No.: US 8,023,724 B2
(45) Date of Patent: Sep. 20, 2011

(54) APPARATUS AND METHOD OF INFORMATION EXTRACTION FROM ELECTROMAGNETIC ENERGY BASED UPON MULTI-CHARACTERISTIC SPATIAL GEOMETRY PROCESSING

(75) Inventor: Blair A. Barbour, Madison, AL (US)

(73) Assignee: Photon-X, Inc., Huntsville, AL (US)

( * ) Notice: Subject to any disclaimer, the term of this patent is extended or adjusted under 35 U.S.C. 154(b) by 1866 days.

(21) Appl. No.: 11/045,703

(22) Filed: Jan. 28, 2005

(65) Prior Publication Data
US 2005/0163365 A1 Jul. 28, 2005

Related U.S. Application Data

(63) Continuation-in-part of application No. 09/621,768, filed on Jul. 21, 2000, now abandoned.

(60) Provisional application No. 60/145,017, filed on Jul. 22, 1999, provisional application No. 60/145,194, filed on Jul. 23, 1999, provisional application No. 60/145,264, filed on Jul. 26, 1999.

(51) Int. Cl.
*G06K 9/00* (2006.01)

(52) U.S. Cl. ........ 382/154; 356/364; 356/367; 359/291; 345/540

(58) Field of Classification Search .................. 382/154; 356/364, 367, 368; 345/31, 97
See application file for complete search history.

(56) References Cited

U.S. PATENT DOCUMENTS

| | | | |
|---|---|---|---|
| 3,440,424 A | 4/1969 | Buhrer | |
| 3,981,587 A | 9/1976 | Gievers | |
| 4,174,818 A * | 11/1979 | Glenn | 244/3.13 |
| 4,858,000 A | 8/1989 | Lu | |
| 5,102,222 A | 4/1992 | Berger et al. | |
| 5,311,285 A | 5/1994 | Oshige et al. | |
| 5,313,210 A | 5/1994 | Gail | |
| 5,335,066 A | 8/1994 | Yamada et al. | |
| 5,337,146 A * | 8/1994 | Azzam | 356/367 |
| 5,396,329 A | 3/1995 | Kalawsky | |
| 5,521,705 A * | 5/1996 | Oldenbourg et al. | 356/368 |
| 5,552,787 A | 9/1996 | Schuler et al. | |
| 5,557,261 A | 9/1996 | Barbour | |
| 5,890,095 A | 3/1999 | Barbour et al. | |
| 6,043,887 A | 3/2000 | Allard et al. | |
| 6,075,235 A | 6/2000 | Chun | |
| 6,710,921 B2 * | 3/2004 | Hansen et al. | 359/485.05 |
| 6,967,617 B1 * | 11/2005 | McMillan et al. | 342/188 |
| 7,023,546 B1 * | 4/2006 | McMillan | 356/364 |

(Continued)

*Primary Examiner* — Wesley Tucker
*Assistant Examiner* — Aklilu Woldemariam
(74) *Attorney, Agent, or Firm* — Pearne & Gordon LLP

(57) ABSTRACT

An apparatus for information extraction from electromagnetic energy via multi-characteristic spatial geometry processing to determine three-dimensional aspects of an object from which the electromagnetic energy is proceeding. The apparatus receives the electromagnetic energy. The received electromagnetic energy has a plurality of spatial phase characteristics. The apparatus separates the plurality of spatial phase characteristics of the received electromagnetic energy. The apparatus r identifies spatially segregated portions of each spatial phase characteristic, with each spatially segregated portion of each spatial phase characteristic corresponding to a spatially segregated portion of each of the other spatial phase characteristics in a group. The apparatus quantifies each segregated portion to provide a spatial phase metric of each segregated portion for providing a data map of the spatial phase metric of each separated spatial phase characteristic. The apparatus processes the spatial phase metrics to determine surface contour information for each segregated portion of the data map.

14 Claims, 12 Drawing Sheets

U.S. PATENT DOCUMENTS

| | | | |
|---|---|---|---|
| 7,757,737 B2* | 7/2010 | Eguchi | 156/378 |
| 2002/0101659 A1* | 8/2002 | Hansen et al. | 359/486 |
| 2005/0134843 A1* | 6/2005 | Laue et al. | 356/239.1 |
| 2005/0270530 A1* | 12/2005 | Wada et al. | 356/364 |
| 2007/0086071 A1* | 4/2007 | Gila et al. | 358/518 |
| 2008/0192074 A1* | 8/2008 | Dubois et al. | 347/5 |

* cited by examiner

LINEAR 0°

LINEAR 45°

LINEAR 90°

CIRCULAR LH/RH

APPARATUS AND METHOD OF INFORMATION EXTRACTION FROM ELECTROMAGNETIC ENERGY BASED UPON MULTI-CHARACTERISTIC SPATIAL GEOMETRY PROCESSING

RELATED APPLICATIONS

This application claims the benefit of U.S. patent application Ser. No. 09/621,768, filed Jul. 21, 2000, which claims benefit of U.S. Provisional Application No. 60/145,017, filed Jul. 22, 1999, U.S. Provisional Application No. 60/145,194, filed Jul. 23, 1999, and U.S. Provisional Application No. 60/145,264, filed Jul. 26, 1999.

FIELD OF THE INVENTION

The present invention is directed to an apparatus and method that extracts and exploits information conveyed within spatial phase (e.g., three-dimensional geometry) characteristics of electromagnetic energy (e.g., light), and is particularly directed to apparatus and method that extracts data from multi-characteristic spatial phase processing as a novel approach to providing information useful for imagery and the like.

BACKGROUND OF THE INVENTION

Conventional imaging systems employ intensity-based techniques to handle electromagnetic energy proceeding from a source (e.g., an object). As one example of a conventional system, a spectroscopic system determines spectral (wavelength) composition of objects and scenes. The wavelengths that comprise the collected energy are separated with the use of a dispersive element employing refractive means, such as a prism, or diffractive means, such as a grating. After passing through one of these dispersive elements, the different wavelength components of the wave front propagate in different directions and the intensities of the components are recorded by an array of detector pixels. Such a standard spectrometer is an excellent device for determining the spectral composition of light emanating from a source object, but is unable to maintain two-dimensional spatial integrity of the source object. Typically, such a spectrometer is not capable of determining spectral content on a pixel-by-pixel basis, and merely collects the total intensity of electromagnetic energy proceeding from an object.

Fourier transform and Fabry-Perot interferometer systems are capable of performing imaging spectrometry and determining the spectral composition of an object on a pixel-by-pixel basis. However, there are certain limitations imposed by the geometry of these systems. For example, in both types of systems, field of view of is severely restricted.

For the Fourier transform interferometer, the length of the system, combined with the small size of the mirrors, restricts the field of view because optical rays will not propagate through the system for large angles. Therefore, the number of pixels that can be acquired is limited.

For the Fabry-Perot interferometer, a small field of view is the result of two main effects. First, the light coming from the source object undergoes multiple reflections within a mirrored optical cavity before emerging from the system. When the incident light comes from an off-axis point on the object, it enters the cavity at an incident angle other than zero. Consequently, as the light undergoes multiple reflections, it will "walk" along the mirrors and eventually leak out of the cavity. The result of this behavior is that, as the field of view increases, the energy throughput of the system decreases.

The second problem that results in a limitation of the field of view for the Fabry-Perot system has to do with band pass variation with field size. Since the effective mirror separation changes with field angle, so does the filter band pass. To minimize the spectral variation from the center to the edge of the field, the field of view has to be small. However, this will again limit the number of pixels that can be obtained.

Still another problem that can arise with respect to some known systems, such as the Fourier transform interferometer, deals with image registration. Typically, two-dimensional images are acquired as one mirror is scanned. Problems associated with scanning, such as mirror jitter, uneven scanning, or mirror walking, create registration problems between the images in the different spectral bands.

In addition, many known systems employ scanning to acquire the spectral composition of the electromagnetic energy proceeding from a source object. During such scanning, it difficult to obtain the spectral composition in real-time while maintaining a high signal-to-noise ratio. This is not only a problem for the Fourier transform and Fabry-Perot interferometers, but also for electrically scanned systems such as liquid crystal systems and acousto-optic tunable filter based imaging spectrometers, which have the additional problem of relatively low transmission.

Tomographic-based methods are sometimes used for imaging spectrometry tasks. Tomographic methods negate the need for scanning. However, the downside of this technique is that it is computationally intensive, requiring the mathematically determination of a system matrix, which is usually application specific.

As mentioned above, conventional imaging techniques employ intensity collection techniques. However, it is to be noted that, in distinction, spatial phase is intensity independent. Spatial phase characteristics of electromagnetic energy include characteristics of the plurality of polarizations (e.g., linear and circular) that are present within the electromagnetic energy.

As one type of utilization of polarization characteristics, polarimetry identifies, isolates, and/or uses a generalized polarization of electromagnetic energy. In the past, scientists have used polarimetry to filter imagery for specific applications. Polarization filters are used to collect polarization data, and classical polarization theory is used to determine one level of the spatial phase properties. However, overall spatial phase of a propagated electromagnetic wave can a significant amount of information that is indicative of unique features about the wave history. For example, as properties of an electromagnetic wave change as the wave interacts with media and changes as the wave transverses a surface.

In the past, scientists have attempted to build operational imaging polarimeters. None have been successful in providing an operation device that has abilities greater than a two channel orthogonal system. The polarimeters to date have been limited to a single set of four detectors or a rotating polarization analyzer. The rotating analyzer limits the system to static scenes and is not a useful tool for spatial phase analysis.

Another problem that arises for imaging systems that employ moving components, such as a rotating member, deals with the issue of image registration. However, problems associated with rotating, such as optical wedge wobbling, uneven rotating, or beam walking, create registration problems between the images in the different phase channels. With spatial phase imaging, it is critical that each channel is identical in spatial content as well as angular information. Rotating systems will vary the angular extent of the object and cannot be used effectively. Therefore, while some of the prior art is capable of performing limited polarimetry and other intensity-based applications, it is not capable, for the reasons discussed, of providing true, multi-dimensional, real-time spatial phase imaging.

The inventor has recognized that a spatial phase system would solve the above-mentioned problems and also gone further into the complete analysis of the phase information, which is contained in the electromagnetic energy. By the scientific analysis of all the radiation being transmitted, reflected, emitted and/or absorbed, one can determine its phase properties. The phase properties are those characteristics that convey information (e.g., an indication of the media through which a wave has passed) that could allow significant imaging abilities. Along these lines, the inventor has recognized that spatial phase is a technology with tremendous benefit potential.

SUMMARY OF THE INVENTION

In accordance with one aspect, the present invention provides an apparatus for information extraction from electromagnetic energy via multi-characteristic spatial geometry processing to determine three-dimensional aspects of an object from which the electromagnetic energy is proceeding. The apparatus includes means for receiving the electromagnetic energy. The received electromagnetic energy has a plurality of spatial phase characteristics. The apparatus includes means for separating the plurality of spatial phase characteristics of the received electromagnetic energy. The apparatus includes means for identifying spatially segregated portions of each spatial phase characteristic, with each spatially segregated portion of each spatial phase characteristic corresponding to a spatially segregated portion of each of the other spatial phase characteristics in a group. The apparatus includes means for quantifying each segregated portion to provide a spatial phase metric of each segregated portion for providing a data map of the spatial phase metric of each separated spatial phase characteristic. The apparatus includes means for processing the spatial phase metrics to determine surface contour information for each segregated portion of the data map.

In accordance with another aspect, the present invention provides an apparatus for information extraction from electromagnetic energy via multi-characteristic spatial geometry processing. The apparatus including means for receiving electromagnetic energy from an object. The received electromagnetic energy has a plurality of spatial phase characteristics, including at least one non-polarization spatial phase characteristic. The apparatus includes means for separating the plurality of spatial phase characteristics of the received electromagnetic energy. The apparatus includes means for identifying spatially segregated portions of each spatial phase characteristic, with each spatially segregated portion of each spatial phase characteristic corresponding to a spatially segregated portion of each of the other spatial phase characteristics in a group. The apparatus includes means for quantifying each segregated portion to provide a spatial phase metric of each segregated portion for providing a data map of the spatial phase metric of each separated spatial phase characteristic. The apparatus includes means for processing the data maps of the spatial phase metrics to determine characteristics of that object, including means for determining a surface profile of the object in three dimensions.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF EXAMPLE EMBODIMENTS

As light propagates and interacts with a surface of an object, the light will be absorbed, reflected, transmitted or emitted back off the surface. It has been appreciated by the inventor that the properties of the light proceeding from the surface contain all the characteristics regarding that object (surface). The characteristics include the object material type, molecular structure (which is a huge factor in what is absorbed and reflected), structure of the molecular elements, orientation of the surface, spectral content, intensity (which is changed by amounts of absorption and reflection), and of coarse polarization of the reflected or emitted light. Within some of the inventor's previous work (see U.S. Pat. No. 5,890,095) there was attention given to benefits which could be developed directly from the classical polarization elements, which only deals with the reflected and emitted components of the light and only deals with the orthogonal s- and p-polarizations. The present invention as set forth herein goes much further into the change in the characteristics of the light after the light interacts with the object. The present invention can characterize the interaction of the light with the surface and from that characterization, determine very precisely what the particulars of the object with which the light interacted. The present invention can characterize the material types and structures as well as orientation of the molecular structures (not to be confused with surface orientation). Also, the present invention can characterize the surface profile in three dimensions, and as such can provide a three-dimensional representation or rendering. In one aspect, the light can be characterized for the three-dimensional shape. In distinction, the inventor's previous work was only directed to the aspect of providing a two-dimensional projection. The present invention can also use the intensity and spectral components to help better characterize the wave properties and the characteristics of the object. As has been appreciated by the inventor, the molecular structure will determine the characteristics of the light wave propagation and the interaction with that object.

Figure 1:
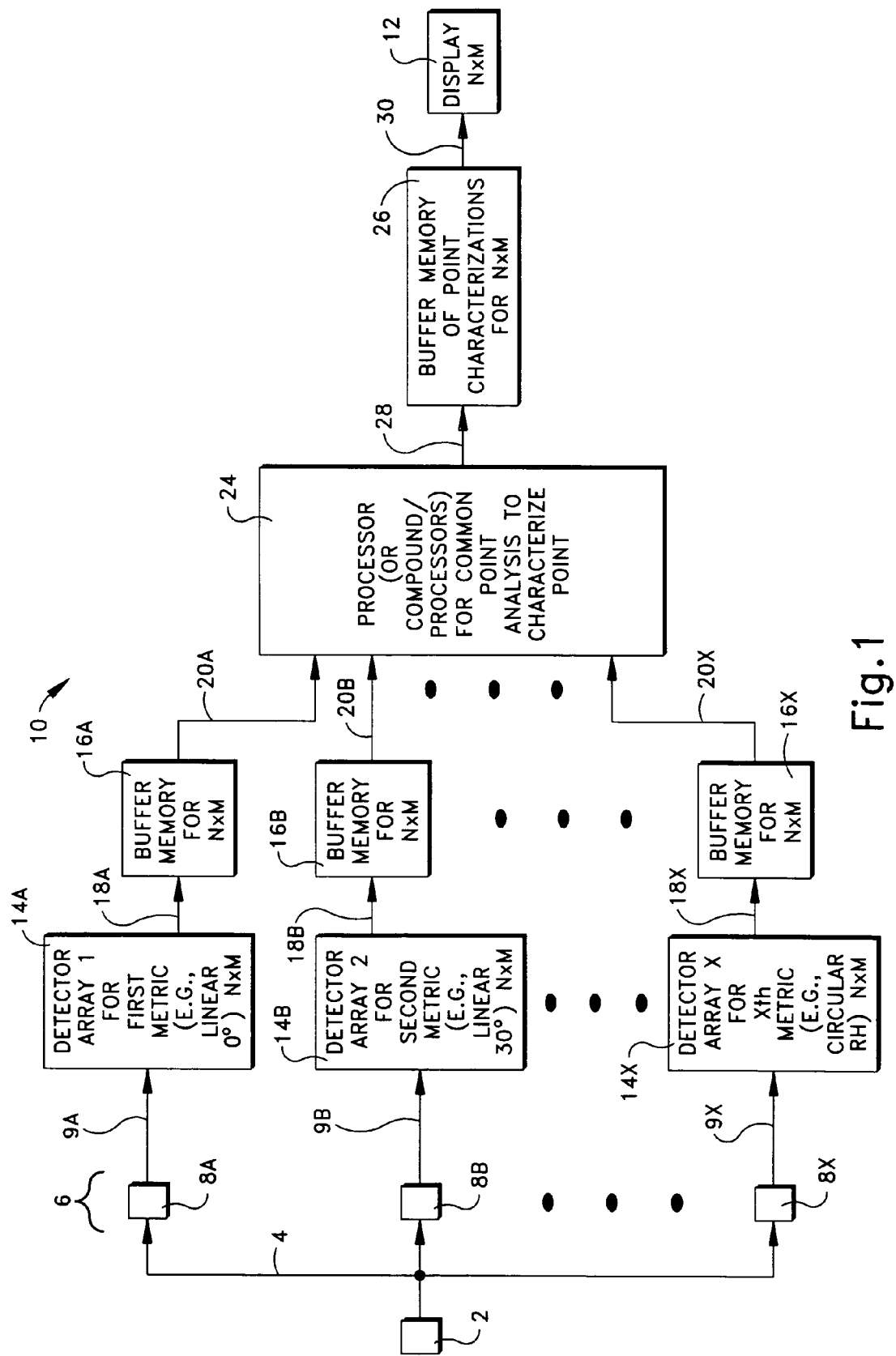
FIG. 1 is an example schematic block diagram of a system in accordance with one aspect of the present invention, the system is an imaging system utilizing separated electromagnetic spatial phase characteristics for image creation.

An example of one type of information discerning and utilizing system 10 in accordance with the present invention is schematically shown in FIG. 1. In the illustrated example, the system 10 is an imaging system. For example, the system may be a camera arrangement. However, it is to be understood that the present invention is not limited to an imaging system. For example, the present invention can be utilized to provide data transfer, identification, recognition, etc.

The imaging system 10 provides a real-time image of an object 2 on a display 12, utilizing multi-characteristic spatial geometric attributes within electromagnetic energy 4 proceeding from the object. Specifically, the three-dimensional elliptical shape of an electromagnetic wave as it sweeps through space provides a multitude of information.

It is to be appreciated that electromagnetic energy is indented to encompass any and all wave energy in the spectrum of electromagnetic energy. Examples of electromagnetic energy include the visible light range, the infrared range, the ultraviolet range, the microwave range, the x-ray range, the gamma ray range, and the radio frequency range. For simplicity, the examples presented herein are discussed primarily with regard to the portion of the electromagnetic spectrum that is at or near the visible, infrared and/or ultraviolet ranges.

Also, the image provided on the display 12 has an appearance dependent upon the operation of the system 10. For example, the image may provide a three-dimensional representation or rendering of the object 2, a contrast representation of the object, a surface orientation/curvature representation of the object, a material composition representation of the object, or a low light level image (shadow penetration) of the object. These imaging feature abilities may be provided by the example embodiments described in more detail below.

In the illustrated example of FIG. 1, an electromagnetic energy-handling portion 6 receives and handles the electromagnetic energy 4 proceeding from the object 2. For the portion of the electromagnetic spectrum that is at or near the visible, infrared and/or ultraviolet ranges the electromagnetic energy-handling portion 6 typically includes optical elements. However, it is to be appreciated that the electromagnetic energy-handling portion 6 will include components appropriate to receive and handle the portion of the electromagnetic spectrum that is to be utilized. For example, the electromagnetic energy-handling portion 6 may include one or more antennas or other receiving structures.

The electromagnetic energy-handling portion 6 specifically includes a plurality of separating/isolating/distinguishing components 8A-8X, which includes a plurality of spatial phase separating/isolating/distinguishing components. Each component (e.g., 8A) functions to separate/isolate/distinguish at least one certain, distinct attribute or characteristic (e.g., 9A, a polarization characteristic) of the electromagnetic energy 4. In particular, the separated/isolated/distinguished attributes or characteristics include spatial phase attribute or characteristic of the electromagnetic energy 4. The separation/isolation/distinction preferably includes spatial slicing of the electromagnetic wave 4. It is to be appreciated that the components 8A-8X may comprise any suitable structure appropriate to accomplish the separating/isolating/distinguishing function. Examples of structures include filters (e.g., polarization), small diffraction gratings, wires or the like, optical elements employing surfaces at predetermined orientations (e.g., Brewster's angle), antenna arrays, and other structures or devices providing the respective separating/isolating/distinguishing function. Preferably, different attributes or characteristics, such as spatial phase attributes or characteristics, are separated/isolated/distinguished via each component (e.g., 8A). In sum, each component (e.g., 8A) provides a version or representation of an image of the object, as perceived in the realm of the distinct attribute(s) or characteristic(s), such as spatial phase, associated with that component.

A plurality of detector arrays 14A-14X is provided within the imaging system 10 and is associated with the plurality of separating/isolating/distinguishing components 8A-8X. Each detector array (e.g., 14A) detects electromagnetic energy having a certain spatial phase attribute or characteristic. Examples of detector arrays include charge coupled display (CCD) arrays and focal plane arrays (FPAs).

Preferably, each detector array (e.g., 14A) detects the certain attribute or characteristic (e.g., spatial phase attribute or characteristic) associated with an associated separating/isolating/distinguishing component (e.g., 8A). Each detector array (e.g., 14A) has a plurality of spatially segregated locations (e.g., pixels) at which an attribute or characteristic metric value, such as a spatial phase metric value, is quantified. It is to be appreciated that although the example embodiment has plural detector arrays, the same function could be accomplished via division of a lesser number (e.g., one) of detector arrays into a plurality of portions (e.g., sub-arrays of pixels). Also, it is to be appreciated that the division may even be at the singular pixel level.

The metric, such as for spatial phase, is a value of the attribute or characteristic at that pixel for the attribute or characteristic associated with that particular detector array (e.g., 14A) or detector array portion. In the illustrated example, each detector array (e.g., 14A) is an N by M array. Accordingly, the metrics provide an N by M map of the characteristic. Further, it is to be appreciated that all of the detector arrays 14A-14X, or detector array portions, are related such that each spatially separated point (e.g., pixel) at each detector array (e.g., 14A), or detector array portion, is related in a group to a corresponding spatially separated point (e.g., pixel) within each of the other detector arrays (e.g., 14B-14X), or detector array portions. Thus, different N by M maps are provided for the different attributes or characteristics.

Suitable means 16A-16X are operatively connected 18A-18X for holding/passing the determined metric values, such as for spatial phase attributes or characteristics, associated with the plurality of the pixels of the detector array 14A-14X. In the illustrated example, such a function is provided by a buffer memory (e.g., 16A) that is operatively (e.g., 18A) connected to a respective detector array (e.g., 14A).

The plurality of buffer memories 16A-16X is operatively connected 20A-20X to a processor 24. In the illustrated example of FIG. 1, the processor 24 is a single processor. However, it is to be appreciated that compound or parallel processors may be employed. In general, the processor 24 determines an imaging value for each group of pixels that correspond among the detector arrays 14A-14X. The imaging value is utilized to provide a portion of the image that is provided on the display 12. The imaging values that are determined by the processor 24 are provided to the display 12 by any suitable means 26. In the illustrated example of FIG. 1, the means 26 is shown as a buffer memory 26 that is operatively connected 28 and 30 to the processor 24 and the display 12, respectively. The buffer memory 26 holds/passes point characterizations of an M by N matrix of the display 12.

Focusing on the operation of the processor 24, the processor determines the imaging value for each pixel by mathematical processes that are performed upon the metric values, such those for spatial phase or other attributes or characteristics, of each associated group of pixels. The processing differs dependent upon the attributes or characteristics that are received at each of the detector arrays 14A-14X. The processing also differs dependent upon the number of detector arrays 14A-14X that are included within the imaging system 10. Regardless of these variable aspects, the processing is based upon the realization that the attributes or characteristics, and in particular spatial phase characteristics, which are present within electromagnetic energy, retain information (e.g., a history of the origin and propagation of the electromagnetic wave). The electromagnetic wave has a unique signature that is exploited by separation for the plurality of detector arrays 14A-14X, the spatially-separated (e.g., pixel) detection at the detector arrays, and the processing within the processor 24. Accordingly, any suitable equation base, such as a stoke-equation base, may be utilized to process spatially-separated spatial phase metric values. Thus, spatial phase characteristic metric values, provided via the detector arrays 18A-18X, are used to create the image.

Also, it is to be appreciated that the processing may include first-level processing that generates spatial phase characteristic metric values using the spatial phase metric values that are provided via the detector arrays 18A-18X. Each particular type of generated spatial phase characteristic metric value may be provided in a complementary size matrix. The generated spatial phase characteristic metric values, with or without the spatial phase characteristic metric values provided via the detector arrays 18A-18X, are then used to create the image. For example, the spatial phase characteristic metric values provided via the detector arrays 18A-18X may include polarization characteristics (e.g., orientation and degree). If view of the fact that the spatial phase characteristic metric values provided via the detector arrays 18A-18X may include polarization characteristics, the spatial phase characteristic metric values may also include polarization characteristics. Some examples of such non-polarization characteristics include intensity, frequency (e.g., color spectrum), etc. The generated spatial phase characteristic metric values may represent shape, material, index of refraction, slope, three-dimensionality, polarization computation, phase geometry, object geometry, or molecular composition.

Turning to the separation of electromagnetic energy into different characteristic separation components 8A-8X, and the spatial phase characteristics that are separated, it is to be appreciated that various physical embodiments may be utilized to separate the spatial phase characteristics. The embodiments may differ dependent upon the number of separations desired and the separations that are accomplished. It is to be appreciated that the desired type and number of separations is related to the number and type of detector arrays 14A-14X, and more importantly the type of processing that occurs within the processor 24.

It is to be appreciated that the imaging system 10, with or without the shown electromagnetic handling portion 6, is considered an imaging apparatus. The distinction only goes to separation state of received electromagnetic energy. For example, the shown electromagnetic handling portion 6 would not be necessary if the electromagnetic energy is provided to the detector arrays 14-14X is a pre-separated/isolated/distinguished format. However, for ease of understanding, the disclosed examples include the separating/isolating/distinguishing feature.

Figure 2:
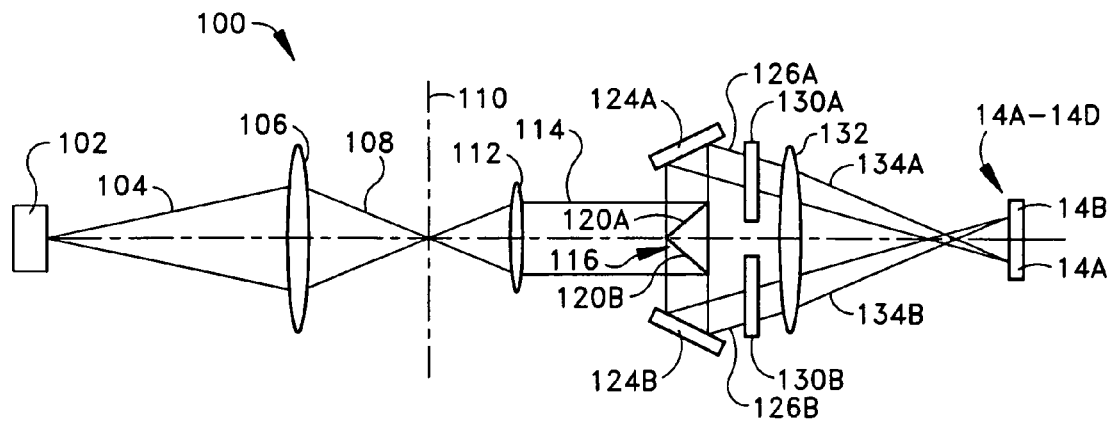
FIG. 2 is an illustration of an example embodiment of an optical system, in accordance with another aspect of the present invention, that may be used to provide the function of separating a plurality of spatial phase characteristics for provision to a plurality of detector arrays of the imaging system of FIG. 1.

Accordingly, FIG. 2 illustrates an example of one optical arrangement 100 that provides the function (i.e., provide separated spatial phase characteristics) of the electromagnetic energy-handling portion 6 of the imaging system 10 of FIG. 1. Specifically, the separated spatial phase characteristics include polarization characteristics. However, it is to be appreciated that the example of FIG. 2 is not a limitation of the subject invention, but is merely one embodiment of the electromagnetic energy-handling portion 6.

The optical system 100 is utilized within an embodiment of the imaging system 10 that has four detector arrays (i.e., 14A-14D). Also, in the example of FIG. 2, the source object 2 that is to be imaged is a physical object 102. FIG. 2 illustrates the object 102 in a schematic (i.e., block) configuration. It is to be appreciated that the object 102 may take any form.

Electromagnetic energy (e.g., light) 104 that proceeds from the object 102 is received at a first optic arrangement 106, which is preferably is a multi-element, sequential lens arrangement. The electromagnetic energy 108 that proceeds from the first optic arrangement 106 is focused at a field stop 110 and proceeds to a second optic arrangement 112. Preferably, the second optic arrangement 112 is a multi-element, sequential lens arrangement. The second optic arrangement 112 collimates the electromagnetic energy into a beam 114. It should be appreciated that the cross-section of the electromagnetic beam 114 is representative of electromagnetic energy from the entire object 102.

A pyramid prism 116 is located such that the beam 114 impinges upon each of four prism faces (only two faces 120A and 120B shown for simplicity). Specifically, the prism 116 is at a pupil plane that is oriented perpendicular to the beam. Associated with each of the prism faces (e.g., 120A and 120B) is a reflecting surface (only two shown, e.g., 124A and 124B). Reflected beams (only two shown, e.g., 126A and 126B) that proceed from the reflecting surfaces (e.g., 124A and 124B) impinge on respective phase/polarization filters (only two of the four filters shown for simplicity, e.g., 130A and 130B). Accordingly, in the example of FIG. 2, the pupil plane is split or separated into a plurality (i.e., four) parts.

Figure 3A:
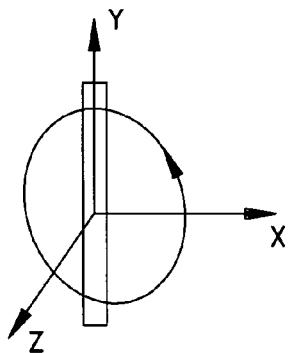
FIGS. 3A-3D are graphical representations of the spatial phase characteristics that are separated by the optical system of FIG. 2.
Figure 3B:
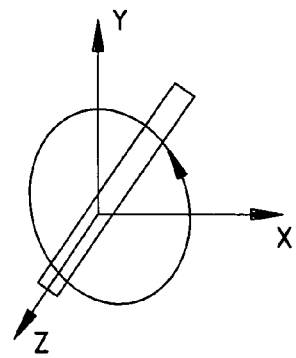
Figure 3C:
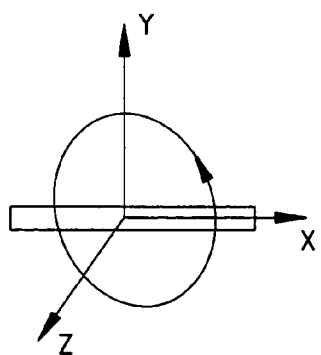
Figure 3D:
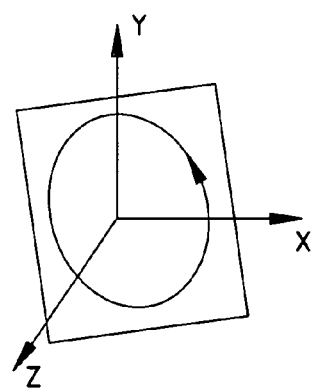
Figure 4A:
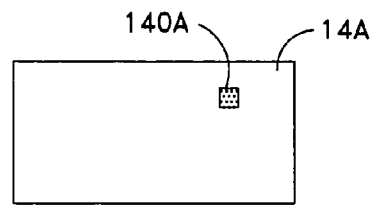
FIGS. 4A-4D are schematic representations of detector arrays of the system of FIG. 1, and have example representation spatial phase metric values shown for a pixel group.
Figure 4B:
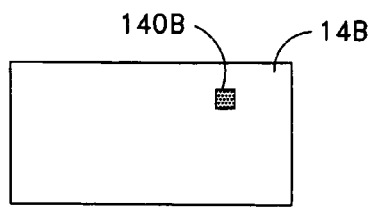
Figure 4C:
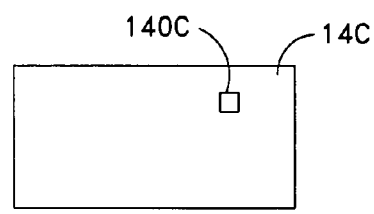
Figure 4D:
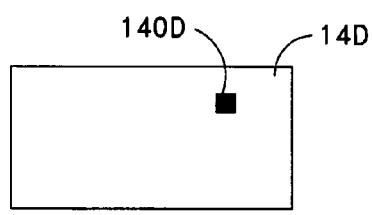

Each phase/polarization filter (e.g., 130A) permits passage of only a certain spatial phase attribute or characteristic. Within this particular example, the spatial phase characteristics are directed toward polarization characteristics of the electromagnetic energy. However, the present invention is not limited to only polarization characteristics. Within the shown example, the first phase/polarization filter 130A passes only linear polarization at a zero degree phase. Such a polarization characteristic is illustrated by the graphic of 3A. The second phase/polarization filter 130B passes only linear polarization at a 45° phase. Such a polarization characteristic is illustrated by the graphic of FIG. 3B. The third phase/polarization filter passes only linear polarization at a 90° phase. Such a polarization characteristic is illustrated by the graphic of FIG. 3C. The fourth phase/polarization filter passes only circular (e.g., left-hand/right-hand) polarization. Such a polarization characteristic is illustrated by the graphic of FIG. 3D. Accordingly, in the example of FIG. 2, the four parts from the pupil plane are each filtered in a different manner to create four different characteristic conveying beams (e.g., 134A and 134B), wherein each beam has a different "slice" of the overall spatial properties of the electromagnetic energy 104.

Turning again to FIG. 2, a third optic arrangement 132 is provided for focusing electromagnetic energy (e.g., 134A and 134B) as a plurality of images for the plurality of detector arrays 14A-14D. Specifically, the third optic arrangement 132 focuses the electromagnetic energy proceeding from the first reflecting surface 124A that passes through the first phase/polarization filter 130A onto the first detector array 14A. Similarly, the third optic arrangement 132 focuses the electromagnetic energy that proceeds from the second reflecting surface 124B that passes through the second phase/polarization filter 130B onto the second detector array 14B. Similar focusing occurs for the third and fourth detector arrays. Preferably, the third optic arrangement 132 is a multi-element, sequential lens arrangement. One important feature that is associated with the embodiment of FIG. 2 is that the optical elements are non-moving.

It should be appreciated that the focusing of the images onto the detector arrays 14A-14D is such that there is a point-by-point (e.g., pixel-by-pixel) correspondence between all of the detector arrays. In other words, each certain pixel position at each detector array (e.g., 14A) corresponds to an identical certain pixel position at all of the other detector arrays (e.g., 14B-14D). Thus, the dissected polarization characteristics for each pixel can be processed within the processor 24 (FIG. 1).

Such a correspondence of the dissected polarization characteristics is shown by the representations of FIGS. 4A-4D. Specifically, a pixel 140A location on the first detector array 14A has a certain polarization metric value that is represented by certain shading within FIG. 4A. It is to be appreciated that the polarization metric value for the polarization characteristic (e.g., linear polarization at zero phase) has a value that is dependent upon the image as provided to the first detector array 14A for the certain polarization characteristic. The FIGS. 4B-4D have similar graphical shading representations for pixels 140B-140D, respectively, to indicate polarization metric values of their associated polarization characteristics (e.g., linear polarization at 45° in FIG. 4B, linear polarization at 90° in FIG. 4C, and circular polarization in FIG. 4D).

Again, turning to the imaging system 10 of FIG. 1, the processor 24 utilized the mapping created by the separation. Specifically, the processor 24 performs the mathematical process on the attribute or characteristic (e.g., spatial phase, such as polarization) metric values within the group for each pixel location to provide an image value that will be displayed to create the image at the display 12 for the certain pixel location.

Figure 5:
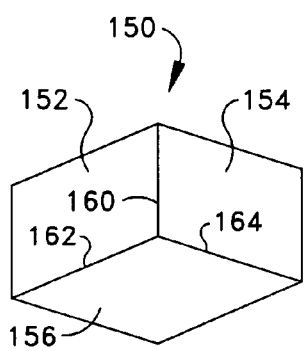
FIG. 5 is an illustration of an object having a plurality of distinct surfaces.

Turning to the benefits associated with an imaging apparatus in accordance with the present invention, an image created utilizing polarization characteristics is not subject to the limitations associated with various known imaging techniques. To illustrate, attention is directed to FIG. 5, which shows a three-dimensional object 150. For simplicity, the object 150 is shown as a cube. In FIG. 5, the cube 150 is oriented such that three surfaces 152, 154, and 156 are presented. Edges 160-164 separate the three presented surfaces 152-156.

Figure 6:
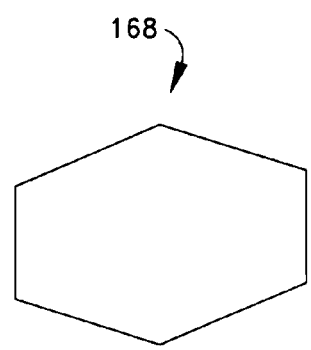
FIG. 6 is an image of the object of FIG. 5 provided via thermal imaging when a temperature gradient between the surfaces does not exist.

Now, assume that the cube 150 is at an ambient temperature and does not have any temperature gradient between any portion (e.g., the surfaces 152-156). Conventional infrared imaging of the cube 150 produces an image 168 as shown in FIG. 6. Specifically, so long as the cube 150 is at a thermal gradient to its background, the cube is distinguishable, but because of the lack of a thermal gradient between the portions of the cube, only an outline of the cube is discerned.

Figure 7:
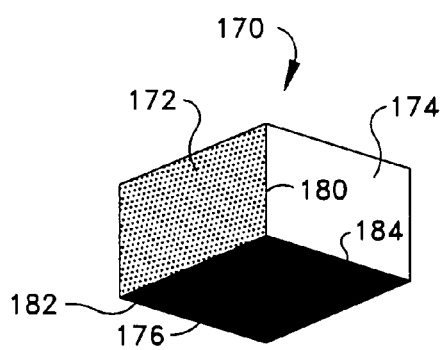
FIG. 7 is an image of the object of FIG. 5 provided by the system of FIG. 1 and in accordance with the present invention under the same temperature conditions as the image created for FIG. 6.

When the cube 150 of FIG. 5 is imaged with the imaging apparatus in accordance with the present invention, an image 170 (FIG. 7) would be provided on the display 12. Specifically, the image 170 clearly shows three distinct surface representations 172-176 separated by three distinct edge representations 180-184. Again, the ability of the imaging system 10 to provide the image 170 is based upon the fact that the polarization of the electromagnetic energy proceeding from each of the three surfaces 152-156 of the cube 150 of FIG. 5 has some difference in polarization characteristics.

Figure 8:
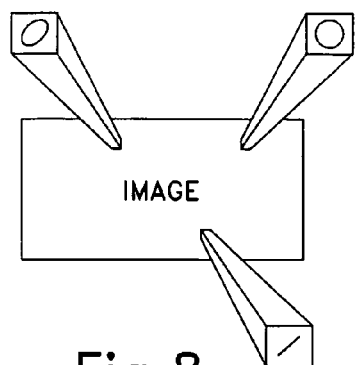
FIG. 8 is a representation of an image of an object, with expanded portions that indicate spatial phase differences between the portions.

It is not so important as to what the differences in the characteristics, such as spatial phase polarization characteristics, are, but it is that a difference exists which permits the image 170 to be created. This concept is illustrated by the representation of an image of a two-dimensional object shown by FIG. 8. The image of the object (represented merely by the text "image") is comprised of pixels that each are associated with a different spatial phase identification. In the example of FIG. 8, three pixels are selected to stand out, and a graphical representation indicating spatial phase identification is provided for each pixel. It is to be noted that the different pixels have different spatial phase identifications.

Figure 9:
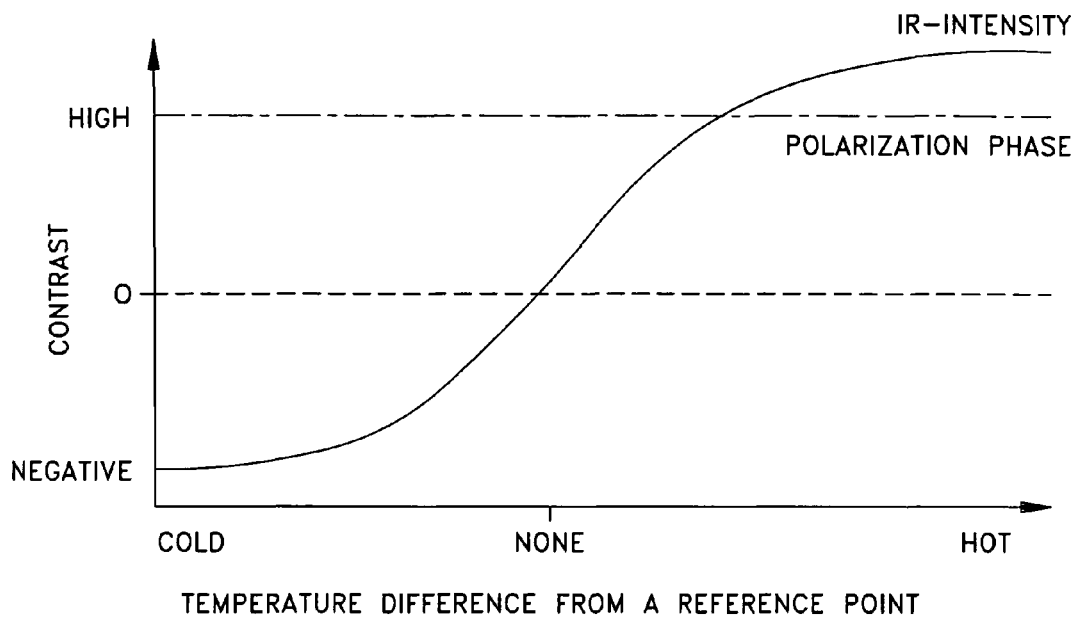
FIG. 9 is a plot indicating contrast during temperature difference change for infrared intensity and polarization phase, as a spatial phase characteristic.

The ability to create an image that has discernable detail is related to the amount of contrast (e.g., polarization contrast), whatever the contrast may be, that can be discerned to create the image. FIG. 9 illustrates contrast that may be discerned for image creation in both an infrared intensity that is known in the prior art, and a spatial phase analysis (e.g., including polarization and/or non-polarization characteristic analysis, in accordance with the present invention. Specifically, at a very large temperature difference, either cold or hot, from a reference point, infrared intensity will provide suitable contrast to permit an image to be created using an infrared technique. However, when a temperature difference does not exist, an image with viable resolution cannot be created using infrared intensity. In contrast, spatial-phase imagery remains at a relatively high contrast regardless of temperature gradient.

Figure 10:
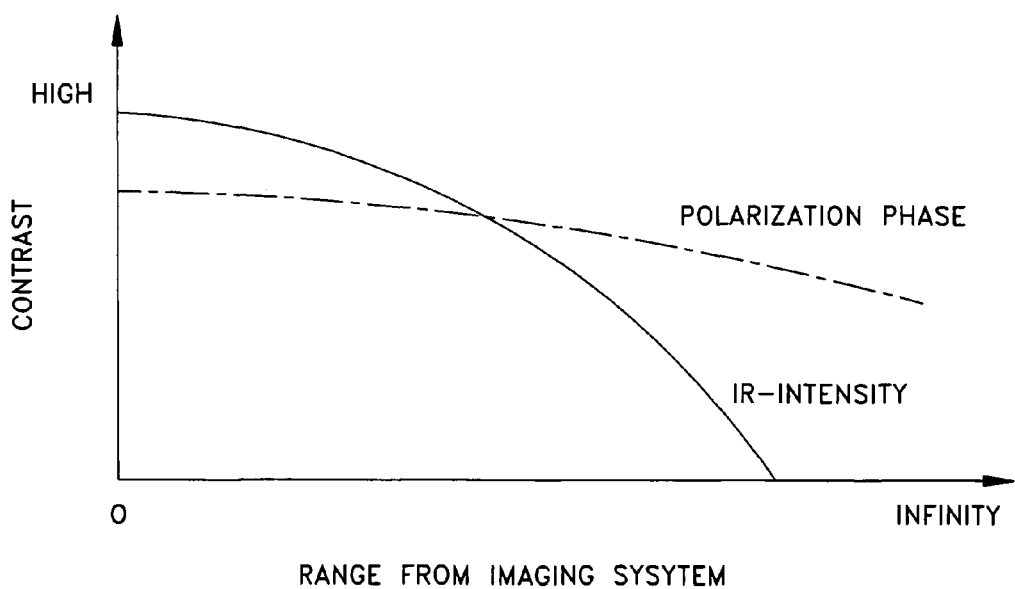
FIG. 10 is a plot indicating contrast over a range of distances from an imaging system for infrared intensity and polarization phase, as a spatial phase characteristic.

Other benefits to spatial phase imagery exist. For example, for an intensity-based imaging system to provide a usable image, sufficient intensity must be supplied to the imaging system. However, intensity decreases as a square of the inverse of the distance between an object and an imaging system. Thus, as shown in FIG. 10, at a relatively close range, an infrared intensity imaging system would provide for relatively high contrast. However, at increased distances, the intensity would decrease to the point that contrast is insufficient for imaging purposes. In distinction, spatial phase, such as including polarization, based image can be generated because spatial phase, such as polarization, characteristics do not decrease, or decrease little in relationship to distance. Thus, so long as some electromagnetic energy is received at the imaging system 10 of FIG. 1, a spatial phase-based (e.g., polarization) image can be created.

Figure 11:
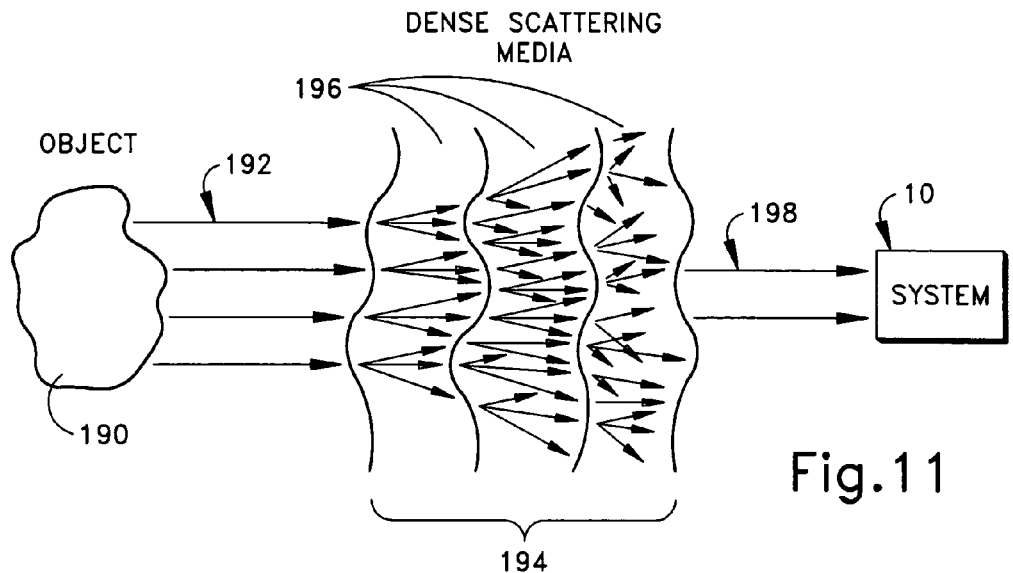
FIG. 11 is an illustration showing scattering of a bulk of electromagnetic energy proceeding from an object with a minimal amount of the energy reaching the system of FIG. 1.

It should be further realized that, in view of the fact that only a certain minimal amount of electromagnetic energy is necessary for the creation of a spatial phase-based image, a relatively large amount of electromagnetic energy that proceeds from an object may be lost or unused without affecting the ability of the system to provide an image. For example, as shown in FIG. 11, an object 190 emits electromagnetic energy 192. A dense scattering media 194 is located between the object and the imaging system 10 and its associated optical system 100. The dense scattering media 194 causes a scattering (e.g., random dispersion) 196 of the electromagnetic energy.

Some electromagnetic energy 198 proceeds from the dense scattering media 194 to the optical system 100 and thus to the imaging system 10. This electromagnetic energy 198 will provide sufficient information within its spatial phase (e.g., polarization) characterization to permit an image to be provided of the object 190.

It is to be appreciated that the dense scattering media 194 may alter spatial phase (e.g., polarization) characteristics. This is due to the fact that spatial phase, such as polarization, characteristics retain a complete history. However, it is to be appreciated that sufficient information contained in the spatial characteristics to permit the image of the object 190 to be created.

Figure 12:
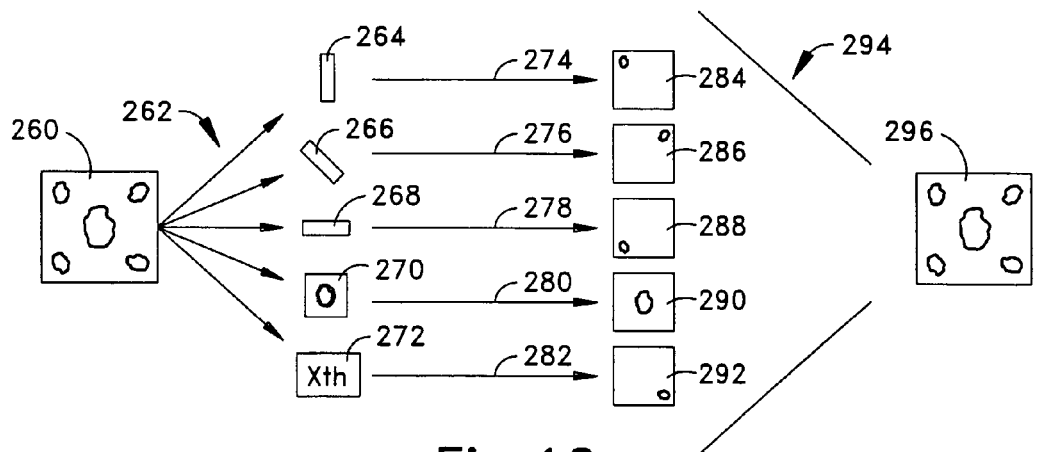
FIG. 12 is a generalized image-creation embodiment showing another approach to separation of electromagnetic spatial phase characteristics from an object.

FIG. 12 illustrates another approach to separation of electromagnetic spatial phase characteristics from an object 260. Electromagnetic energy 262 proceeding from the object 260 is provided to a plurality of isolation components 264-272. The isolation components 264-272 operate to provide certain spatial phase characteristics 274-282 (e.g., slices of the spatial phase of the electromagnetic energy 262). The characteristics 274 are near pure such that the portions 284-292 of the image associated with the respective characteristic are completely separate. Thus, each map created is for a purely distinct spatial phase characteristic.

This complete separation or isolation is accomplished by each isolation component (e.g., 264) operating effectively at 100% efficiency to strip out all spatial phase characteristics except for the desired spatial phase characteristic. As with the other embodiments, the separated characteristics are processed and used (represented schematically by the traces 294) to create an image 296. It is to be appreciated that the identifier "Xth" of the isolation component 272 is intended to represent any attribute or characteristic of the electromagnetic energy 262. As such, the Xth aspect may represent a polarization characteristic or a non-polarization characteristic, such as intensity, frequency (e.g., color spectrum), etc.

It is imperative that it is to be understood that the multitude of different aspects should not be confused with, and are certainly not limited to, just classical polarization elements. Such classical polarization elements are only indicative of the polarization properties as the light is reflected from the surface. As such, the use of only classical polarization elements is a smaller, more limiting, case as compared to the present invention. The present invention expands the utilized characteristics to include the characteristics associated with the interaction of the light wave with the full three dimensional object. It bears repeating that the present invention goes beyond any classical polarization characteristics. Within the present invention, the polarization might be one element that is uses to aid the characterization. However, the present invention uses other aspects, such as the use the index of the material, the spectral interactions with the material index, the structure of the material and the interaction properties to determine a full three dimensional reconstruction to provide a three-dimensional representation or rendering.

Figure 13:
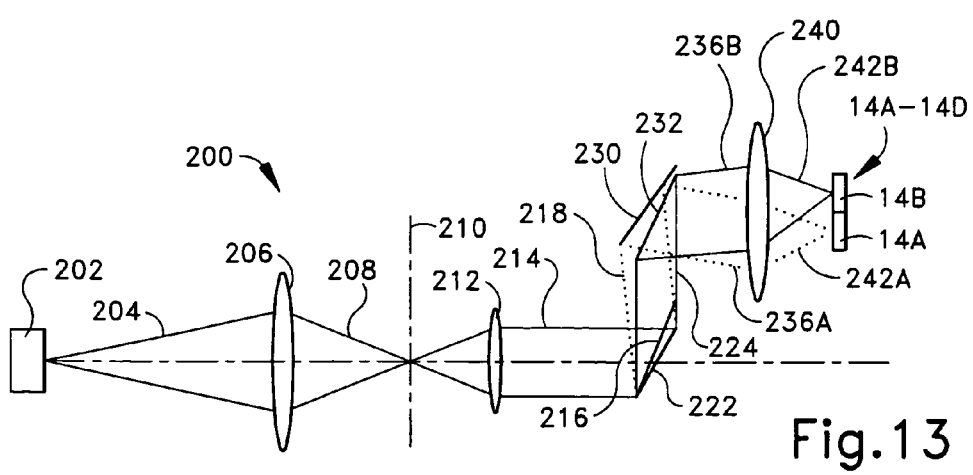
FIG. 13 is an example embodiment of an optical system used to separate electromagnetic energy for detector arrays in accordance the approach of FIG. 12.

FIG. 13 illustrates an example embodiment of an optical system 200 that is utilized to provide separated spatial phase (e.g., polarization) characteristics in accordance with the approach shown in FIG. 12. Of course, it is to be appreciated that although the example of FIG. 13 is an optical system, the approach of FIG. 12 is not so limited. Similar to the embodiment shown in FIG. 2, the elements of the embodiment of FIG. 13 do not move (e.g., non-scanning).

The optical system 200 is utilized within an embodiment of an imaging system (e.g., similar to the imaging system 10 of FIG. 1) that has four detector arrays (i.e., 14A-14D). In the example of FIG. 13, the source object that is to be imaged is a physical object 202.

Electromagnetic energy (e.g., light) 204 that proceeds from the object 202 is received at a first optic arrangement 206, which is preferably is a multi-element, sequential lens arrangement. The electromagnetic energy 208 that proceeds from the first optic arrangement 206 is focused at a field stop 210 and proceeds to a second optic arrangement 212. Preferably, the second optic arrangement 212 is a multi-element, sequential lens arrangement. The second optic arrangement 212 collimates the electromagnetic energy into a beam 214. It should be appreciated that the cross-section of the electromagnetic beam 214 is representative of electromagnetic energy from the entire object 202.

A first interference filter 216 is located in the path of the beam 214. The first interference filter 216 reflects certain polarization characteristic(s) and passes certain polarization characteristic(s) of the electromagnetic energy. The reflected electromagnetic energy provides a beam 218, and the passed electromagnetic energy impinges upon a first reflecting surface 222. A beam 224 extends from the first reflecting surface 222. The first interference filter 216 and the first reflecting surface 222 are at different orientations (e.g., different angles). Thus, the beam 218 and the beam 224 proceed along different paths.

A second reflecting surface 230 and a second interference filter 232 receive the beams 218 and 224. Again, because of the properties of the second interference filter, the electromagnetic energy is further separated based upon polarization properties. Also, because of a difference in orientation of the second reflecting surface 230 and the second interference filter 232 the separated electromagnetic energy is directed along different paths. The result of the separations is four beams (only two shown, e.g., 236A and 236B), with polarization characteristic distinction for each beam.

A third optic arrangement 240 is provided for focusing the electromagnetic energy (e.g., 242A and 242B) as a plurality of images for the plurality of detector arrays 14A-14D. Preferably, the third optic arrangement 132 is a multi-element, sequential lens arrangement. It should be appreciated that the focusing of the images onto the detector arrays 14A-14D is such that there is a point-by-point (e.g., pixel-by-pixel) correspondence between all of the detector arrays. In other words, each certain pixel position at each detector array (e.g., 14A) corresponds to an identical certain pixel position at all of the other detector arrays (e.g., 14B-14D). Thus, the dissected polarization characteristics for each pixel can be processed within the processor 24 (FIG. 1).

Figure 14:
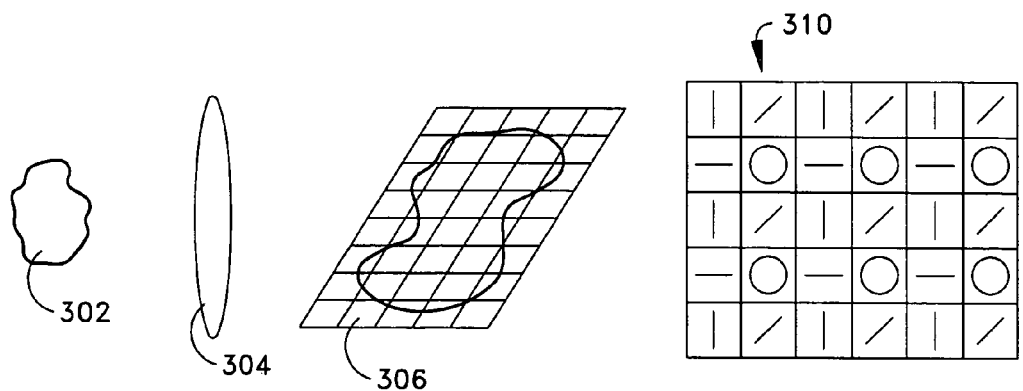
FIG. 14 is a generalized image-creation embodiment showing another approach to separation of electromagnetic spatial phase characteristics from an object.

FIG. 14 illustrates another approach to separation of electromagnetic spatial phase characteristics from an object 302. Electromagnetic energy proceeding from the object 302 is focus by a lens arrangement 304 onto a detector array 306. The detector array 306 has a plurality of discrete locations (e.g., pixels). Each location or pixel collects and stores spatial phase characteristics (e.g., slices of the spatial phase of the electromagnetic energy). The spatial phase identification of the electromagnetic energy at each location is the stores in a matrix 310 (the identification of the electromagnetic energy at each location is represented by a graphical symbol). Thus, the matrix 310 is the map. Further processing can then be accomplished via various used of location-by-location (e.g., pixel-by-pixel) analysis. For example, gradients between adjacent locations (pixels) are analyzed, a series of locations (pixels) are analyzed for curvature. Also, each row or column can be considered to be a slice of the electromagnetic energy. Accordingly, slicing of the electromagnetic energy, to derive information can be accomplished in different ways.

Figure 15:
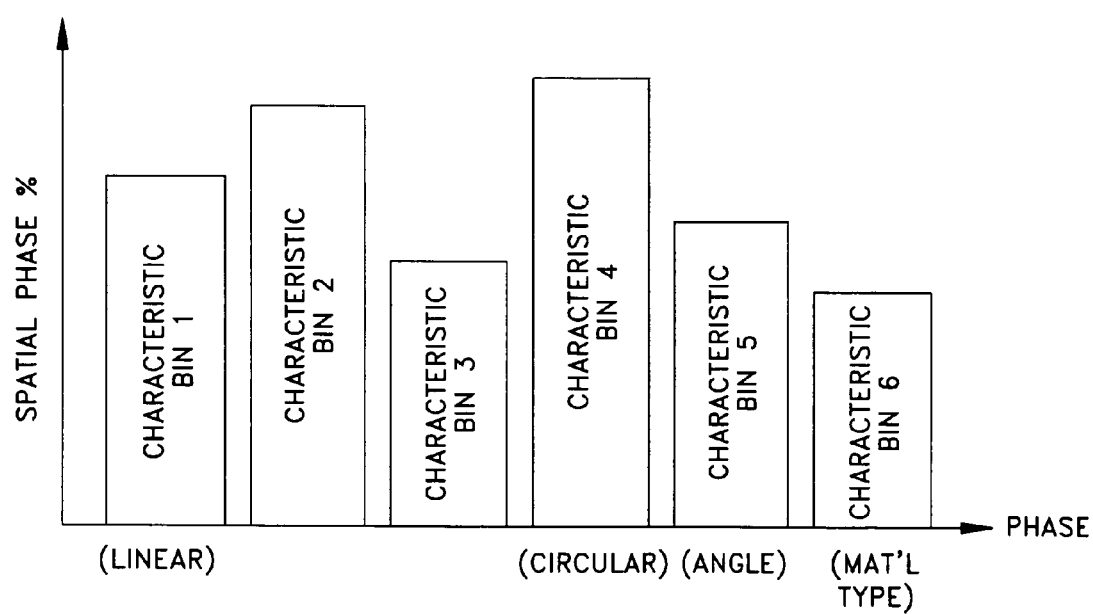
FIG. 15 is a plot indicating examples of spatial phase characteristic.

FIG. 15 is a graphical example that illustrates spatial phase characteristics that may be associated with a single location (e.g., pixel) in the example of FIG. 14 (or in some of the other above-described examples). In the example, the characteristics are separated by identifiers that are also referred to as bins. Further, the bins include polarization characteristics (e.g., the first four bins), angle, and material. Of course, a great variety of characteristics, including non-polarization characteristics are possible.

As another example of the results that can be achieved via the present invention, attention is directed to FIG. 16-21. These Figures are associated with an example in which a three-dimensional representation or rendering is determined. In general, the process involves the determination of surface normals for each of a plurality of pixels within an N by M array. It is to be appreciated that the surface normal is the outwardly directed vector from the at the pixel location. For example, a surface normal extends outward, perpendicular to a flat surface. For use within a processing algorithm, surface normal unit vectors (SNUVs) may be utilized. Of course, it is to be appreciated that the directions of the surface normals change as a function of the curvature of surface. From the determined surface normals, the processor can create or select "seed" locations from which to "grow" a representation of the three-dimensional representation or rendering via a continued sequence of processing.

It should be determined that the calculation to provide the three-dimensional representation or rendering in accordance with the present invention is different from other type of devices that provide some type contour determination (e.g., typically in the form of ranging). In accordance with the present invention, a complete representation (i.e., a complete pixel array) is provided. This is in distinction from a methodology that creates a point cloud and makes distance determinations from such a point cloud. One example of such a device is a LADAR. Such a device must rely upon ranging (i.e., distance determination based upon time of travel to and from a target), via a short-pulse laser. One thing to consider is that there is no connection or correlation between the plurality of pixel points (i.e., each pixel is freestanding). Thus, for each pixel there is no use of the other pixels to help define the surface contour at the particular pixel.

In distinction, the present invention includes the concept of connectivity between the pixel points to generate a three-dimensional representation or rendering. In other words, at each pixel location, the information (e.g., SNUVs) from the other pixels is used to determine the surface. As such, the surface determinations for all of the pixels are interrelated. Moreover, because of the use of interrelationships to determine the surface at each of the pixel, the determinations do not rely upon ranging. In other words, the surface contour of an object is determined irrespective of the distance to the object.

It should be appreciated that various structures, etc. (e.g., electromagnetic energy-handling portions, detector arrays, and buffer memories) can be utilized to gather information. Also, various types processing of gathered information and previously processed information can be employed to provide one of more matrices of pixel information. Some types of information that may be useful for ultimate generation of a three-dimensional representation or rendering include information obtained via flat panel extraction, slope, and rate of surface change.

Turning to the example process, a first step necessary in generating a three-dimensional representation or rendering involves selection of necessary algorithms of programs to conduct the needed processing. It is to be appreciated that the selection must be made in view of the ability to process in a variety of ways to provide a variety of imagery or other output. Also, there may be a necessity to select the necessary image files (i.e., pixel matrices), if additional imagery not needed for three-dimensional determination, have been obtained.

In one example, these files are the original intensity or red, green, blue (RGB) images as taken from the electromagnetic energy-handling portions (e.g., camera equipment). Each image represents the same view with a different Polarimetric filter (e.g., 0°, 45°, 90°). In the one example, there are three of these images, and an optional mask.

Figure 16:
FIG. 16 is an image of an example object, with a test patch indicated.

Once the images are selected, it is possible to conduct some preprocessing. For example, as shown in FIG. 16 (showing a model of an F-117 airplane), a test patch can be selected. Along the line of preprocessing and operation upon the test patch, it is possible to fine-tune parameters that affect how the three-dimensional representation or rendering will be generated. During the preprocessing, it is possible to display multiple images, histograms, surface normals for the object, etc. These allow the user to view how changes affect different aspects of the three-dimensional representation or rendering generation. Also, there can be an option to zoom in, crop, etc.

The images as specified by the input dialog have been loaded into memory at this point and are thus ready for internal processing within the processor. Any RGB images have been converted to grayscale by sampling a single channel from the image. The Stokes images can now be calculated by the following formulas, where I0 is the 0° polarized image, I45 is the 45° polarized image, and I90 is the 90° polarized image.

$$S0 = I0 + I90 \qquad [1]$$

$$S1 = 2(I90) - S0 \qquad [2]$$

$$S2 = 2(I45) - S0 \qquad [3]$$

Once the Stokes images have been calculated, the S0 image is examined to find which pixels are above the user-defined maximum intensity and which pixels are below the user-defined minimum intensity. These pixels are added to the user-defined mask. At this stage, calculation of the degree of linear polarization (DoLP) and θ occurs for each pixel. DoLP represents the out of plane angle, or the angle formed between the two-dimensional image surface and the camera's viewing vector. θ represents the in plane angle, or the angle formed that is parallel to the two-dimensional image plane in three-dimensional space. The equations for calculating DoLP and θ are listed below.

$$DoLP = \frac{\sqrt{S1^2 + S2^2}}{S0} \quad [4]$$

$$\theta = -0.5 * \arctan\left(\frac{S2}{S1}\right) + Q, \text{ where } Q = \frac{\pi}{2} \text{ if } S2 >= 0 \text{ or } -\frac{\pi}{2} \text{ if } S2 < 0 \quad [5]$$

DoLP ranges from 0 to 1, where 0 indicates that the normal lies along the +Z axis directly facing the camera, and 1 indicates that the normal lies in the XY plane perpendicular to the Z axis. θ will range from −π to π. The DoLP and θ images are then smoothed using the user-specified kernel size (or none). Any DoLP pixel that is greater than the user specified maximum or less than the user specified minimum will be added to the mask image. DoLP is then linearly scaled (by the factor given by the user) to produce γ. The directional cosines (α, β, and γ) and the normal vectors for each pixel can be calculated. The directional cosines are given $$\alpha = \arccos\left(\cos\left(\frac{\pi}{2}\right) - \gamma * \cos\left(\theta + \frac{\pi}{2}\right)\right) \quad [6]$$

$$\beta = \arccos\left(\cos\left(\frac{\pi}{2}\right) - \gamma\right) * \cos(\theta) \quad [7]$$

$$\gamma = (\pi * J) * \left(\frac{(DoLP - \min DoLP)}{(\max DoLP - \min DoLP)}\right), \quad [8]$$

where J is the gamma scale factor as entered by the user, and minDoLP and maxDoLP are the minimum and maximum non-masked DoLP values calculated from the input data.

The normal vector's components are given by:

$$x = \sin(\gamma) * \cos\left(\theta + \frac{\pi}{2}\right) \quad [9]$$

$$y = \sin(\gamma) * \cos(\theta) \quad [10]$$

$$z = \cos(\gamma) \quad [11]$$

The final input from the user is the pixel field of view (FOV) and the focal distance. The FOV represents the angle of the area that is visible in the images and the focal distance represents the distance from the lens to the center pixel on the object. With these two parameters, the size of the image can be calculated. The formulas are listed below, where 'f' is focal distance, and 'v' is field of view per pixel.

$$imageHalfWidth = f * \tan\left(CropWidth * \frac{v}{2}\right) \quad [12]$$

$$imageHalfHeight = f * \tan\left(CropWidth * \frac{v}{2}\right) \quad [13]$$

Since all pixels represent an equal amount of area, the width and height can be calculated on a per pixel basis. The image is then centered on the XY plane based upon three-dimensional space, with accurate real-world width and height. The Image currently has no Z-depth, as this is not calculated until the object is subsequently built into a three-dimensional representation or rendering.

At this point, the image is ready to be segmented based upon slope data.

The next stage is one that is not required, but will allow the user to further affect how the object representation will be built. A user can specify that one continuous blob is actually two disjoint objects, and thus those objects will not build as one object. The second function of this dialog is to allow the user to tell the object that a certain panel is contained within the lower hemisphere. Lower hemisphere issues arise as a result of the symmetry of θ about the origin and the limited range of the θ values. The issue is resolved by negating the y component of the normal vector for all lower hemisphere regions. In one example, flat surfaces can be grouped into panels. However, it is possible that curved surfaces can be grouped based on their rates and directions of curvature. The steps for finding flat panels are as follows:

A. Sort all Pixels based on their fitness to be a seed panel. The fitness rank of a pixel (p) is given by the formula:

$$fitness(p) = \sum_{i \in neighbor(p)} \arccos(N(i) \cdot N(p)), \text{ where } N(x) \text{ is the normal} \quad [14]$$

vector of the pixel x and neighbor(x) is the set containing all four pixels that surround the pixel x.

The smaller the fitness rank, the more fit the pixel is to be a seed pixel.

B. Take the most fit unused seed pixel and grow its region out to include all neighboring pixels whose normal is within a user-defined threshold from the seed pixel.

C. If the size of the region is less than a user-defined pixel blob size, then set all pixels in that region as unclaimed.

D. Repeat C-D for all pixels.

E. Grow any unused pixels to the region that is closest to the angle formed by the unused pixels normal and the region's bordering normal.

Figure 17:
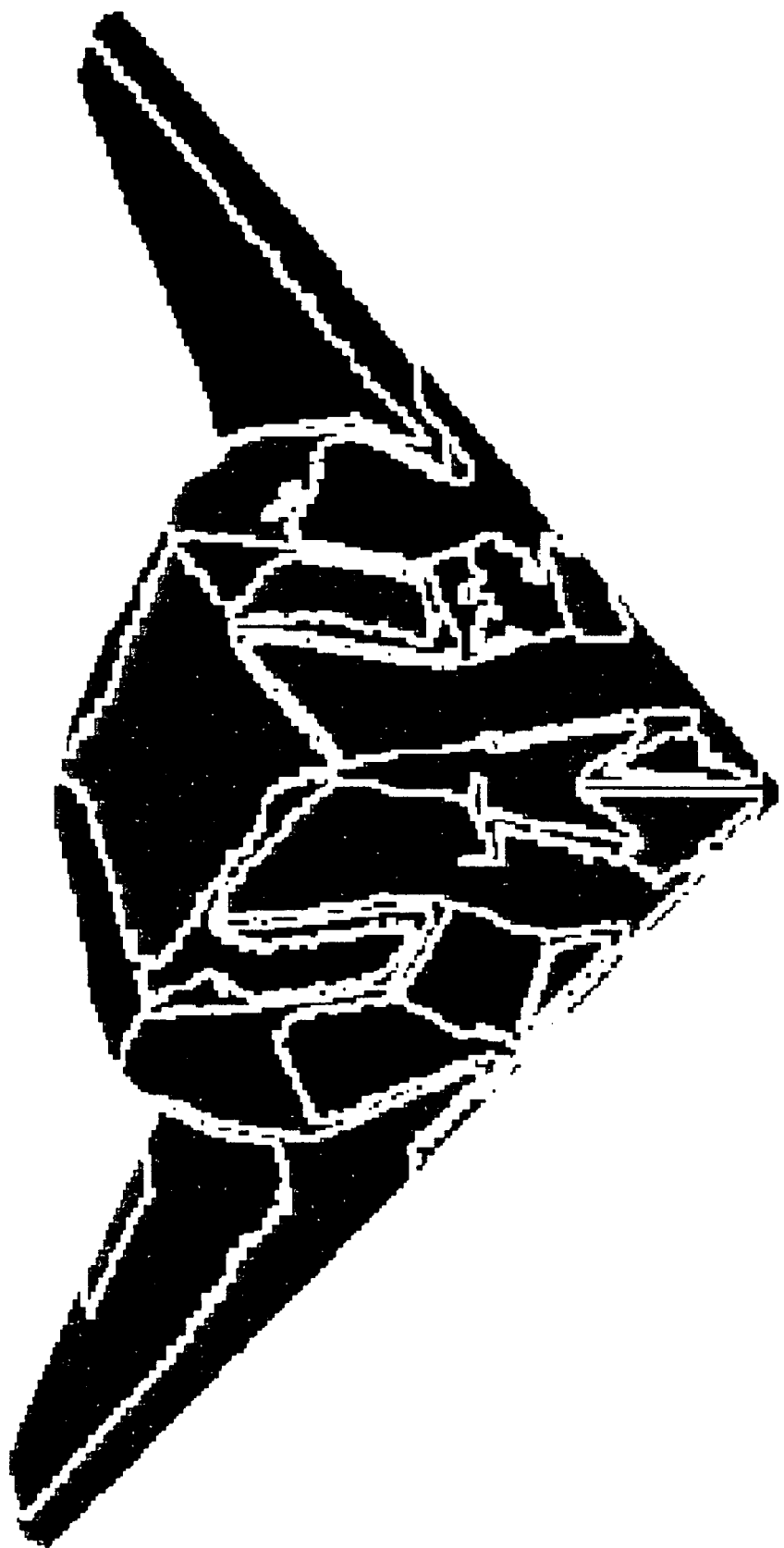
FIG. 17 is an image of the object of FIG. 16, but with the image being provided by data in which surfaces have been grouped.

The results of this algorithm, as applied to imagery of the object (i.e., the model F-117), are shown in FIG. 17. Note the grouping of surfaces.

Figure 18:
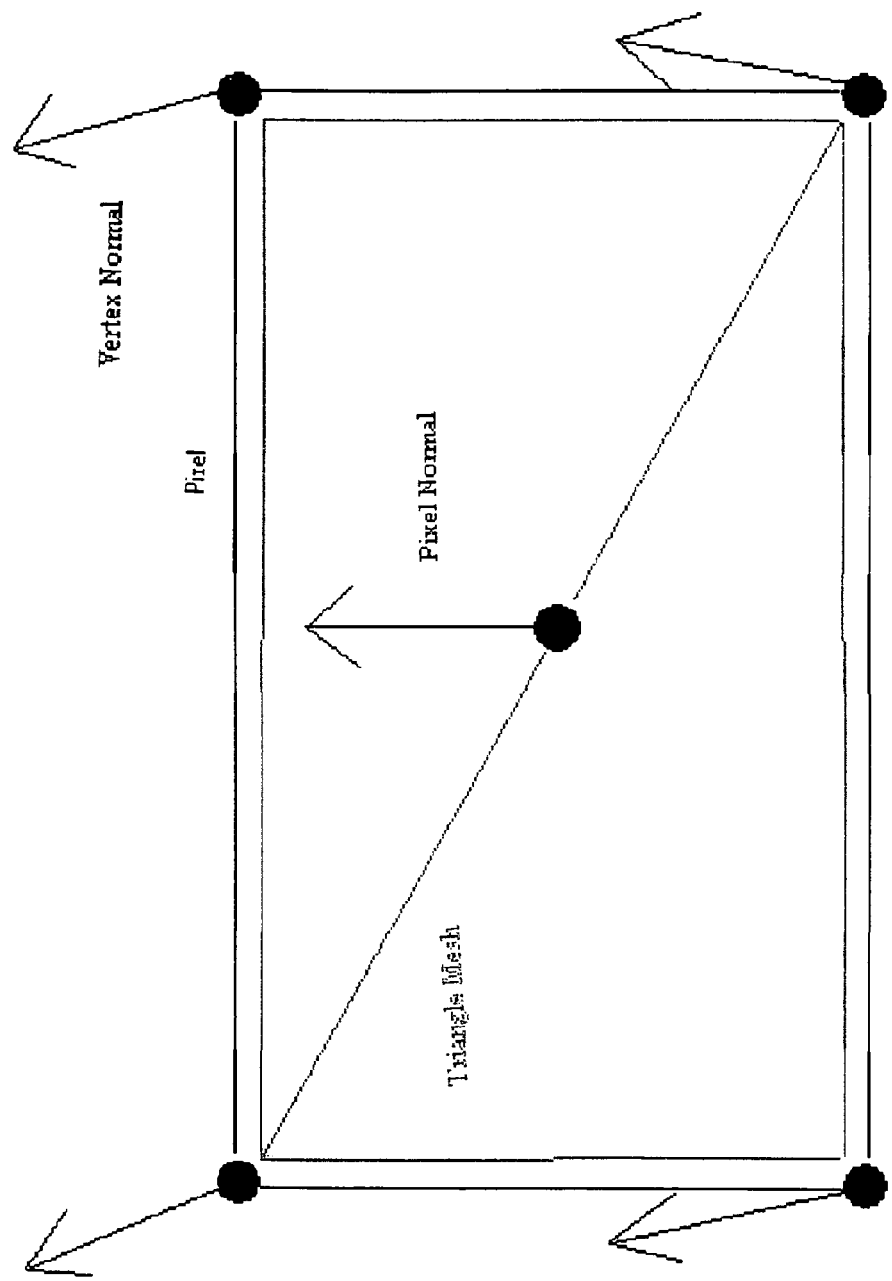
FIG. 18 is a representation of surface contour information of a single pixel and shows how the pixel is considered during processing to determine three-dimensional aspects of the surface to which the pixel is associated.

At this point, the generation of the three-dimensional representation or rendering can commence. The first step is to grow contiguous non-masked regions into distinct blobs. Once all blobs have been identified, each pixel's center position on the image plane is calculated. This calculation is relatively straightforward, as we already know the width and height of the image plane from data entered in the preprocessing dialog. The next step is to create an array of vertex normals that will be used to build our triangular mesh. This array is one row wider and one row higher than the pixels, as we must have one vertex for each corner of a pixel. Each vertex normal is calculated to be the normalized sum of the surrounding pixel normals. FIG. 18 shows how the vertex and pixel normals are related, and how the pixel is broken up into triangles to build the triangular mesh. Specifically, the pixel is defined at the rectangle and the pixel normal is the directional extending from the center of the pixel. A vertex, which is a directional arrow, extends from each of the four corners of the pixel, and the triangular mesh is provided via bisection of the pixel via a diagonal line that provides for two triangles within the pixel (each triangle extending between three of the vertex locations).

The next step is to associate certain vertices as seed pixels. The submeshes will be grown from these seed pixels. In one example, the seed pixels are uniformly spread across the vertex array. However, it is possible to utilize a non-uniform distribution so that the seed pixels are concentrated in regions of high curvature. Placing the seed pixels in regions of high curvature reduces the accumulated error when growing the submeshes. The bulk of the processing is described in the following pseudo code.

For each blob N
  For each seed pixel in blob N
    Grow mesh out from seed pixel out to other seed pixels.
    Submesh seed pixel lies on XY plane.
    Begin stitching submeshes.
      Currently selected submesh, its mesh becomes the anchor.
      For all other seed pixels in blob N
        Translate origin of submesh along the camera->seed pixel line.
        Calculate overlap error between submesh and current output mesh. Overlap error is defined as the sum of the distance between all corresponding vertices.
        Iteratively search for the optimal translation by repeating the prior two steps.
        Average submesh into output mesh.

Figure 19:
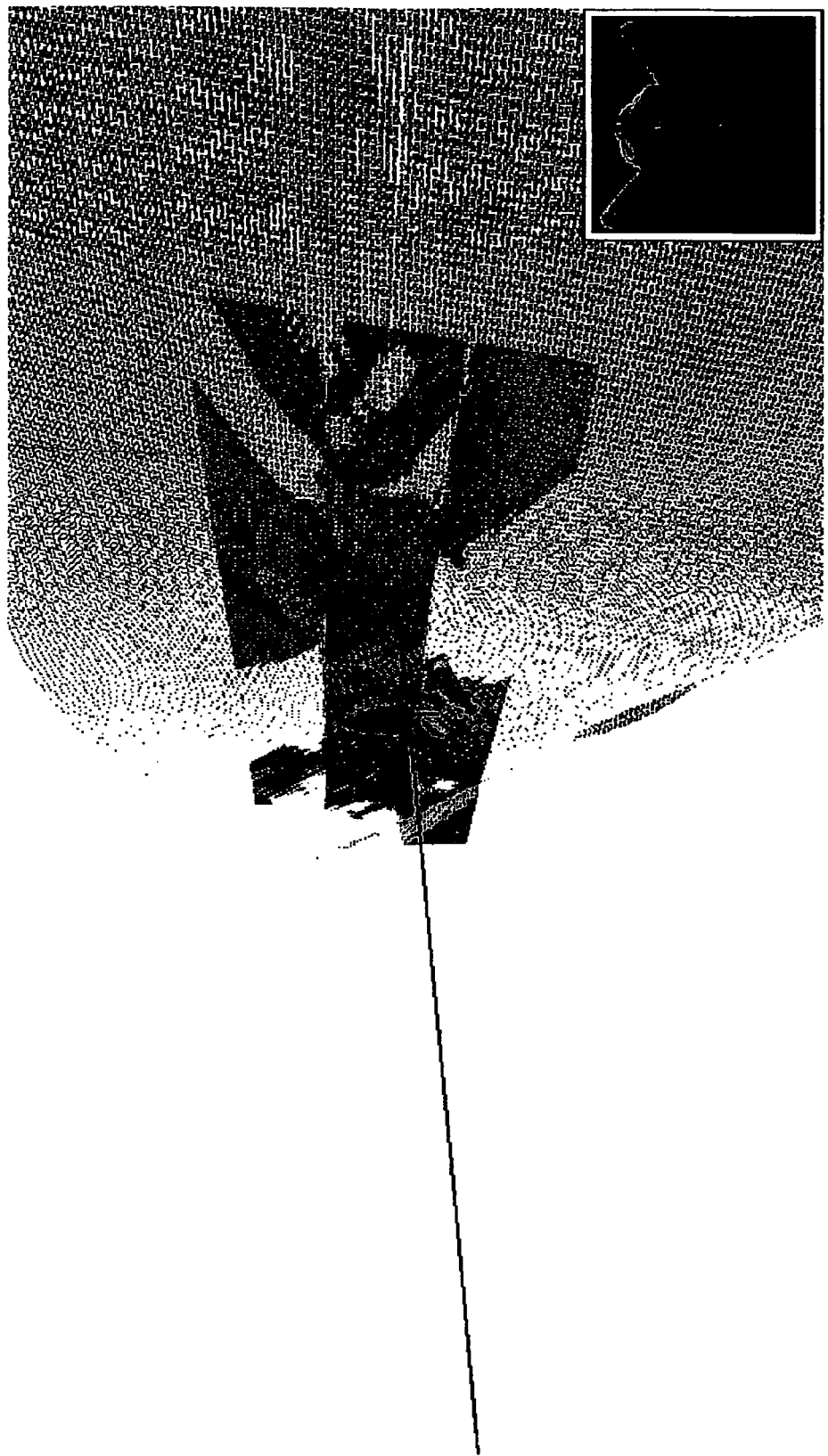
FIG. 19 shows an intermediate image that can be generated to show how several submeshes that have been averaged into the final output mesh that this a three-dimensional representation or rendering of the imaged object.

The position in three-dimensional space of the seed pixels is as calculated during preprocessing, with a Z-depth of 0. The position in three-dimensional space of vertices neighboring the growing submesh is calculated as follows: Given the line of sight to the corner of the pixel, normal to the face of the pixel and the position of the vertex to the left, we can calculate where the face of the pixel will intersect the line of sight. This will be the location for that vertex on the surface of the mesh, and reflects the real-world location of the vertex. A future modification, to improve accuracy in calculating the Z-depth, will be to calculate the position of the submesh vertex using more the one neighbor. This will reduce the influence that a noisy vertex has in altering the correct shape and location of the submesh. A step that is currently taken to reduce this influence is to build overlapping submeshes and average them together. In this manner, error is averaged out of the final mesh. FIG. 19 shows several submeshes that have been averaged into the final output mesh.

Figure 20:
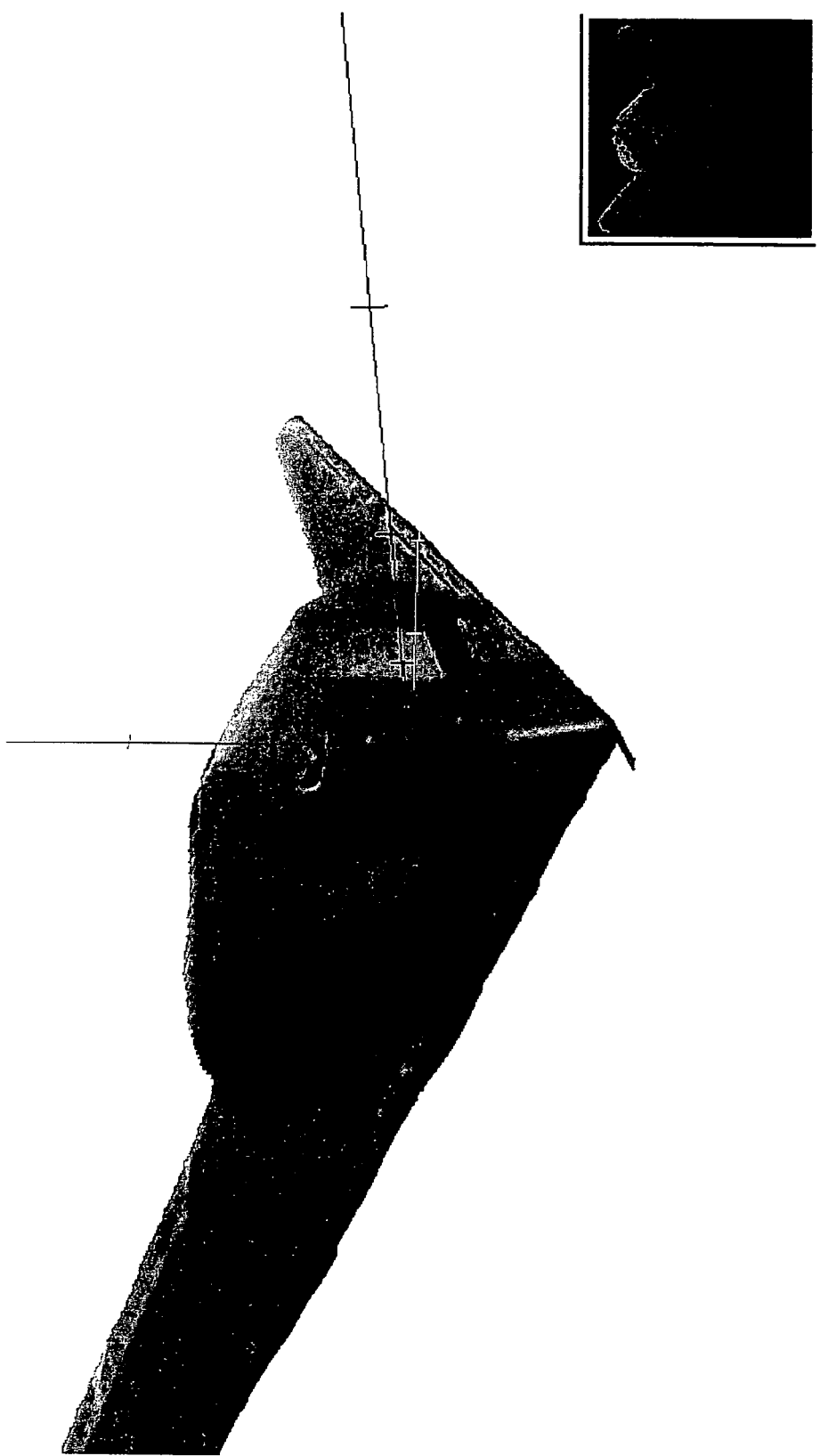
FIG. 20 is a three-dimensional representation or rendering of the imaged object, the representation consists of triangular faces whose edges are the vertices of the object.

The final three-dimensional representation or rendering is displayed in FIG. 20. It consists of triangular faces whose edges are the vertices of the object.

At this point, it is to be appreciated that three-dimensional aspects of the original object can be discerned. The discernment may be via visual inspection of the three-dimensional representation/rendering or may be via additional processing. One type of information may be to determine dimensions of the object. It should be noted that such dimension is in distinction from dimensioning that could be obtained from ranging devices (previously discussed).

In one example, the generated three-dimensional representation or rendering can be further investigated from a volumetric standpoint. This utility allows the user to define multiple geometric constructs on the object and examine the surface more closely. These constructs include a plane, a region of interest (ROI), a line, and a point. The following data can be calculated and provided for a user.

Distance from the point to the camera.
Distance from the point to the plane.
Linear distance along the line.
Surface distance along the line.
Minimum, maximum, and absolute depth from the surface to the plane inside the ROI.
Volume from the surface to the plane inside the ROI.
The physical extents of the object.
The width, height, and depth of the object.
The nearest/farthest distance from the camera to the surface of the object.
A color scale detailing the approximate depth from the plane to the surface inside the ROI.
A graph plotting the surface depth from the plane along the line.

Figure 21:
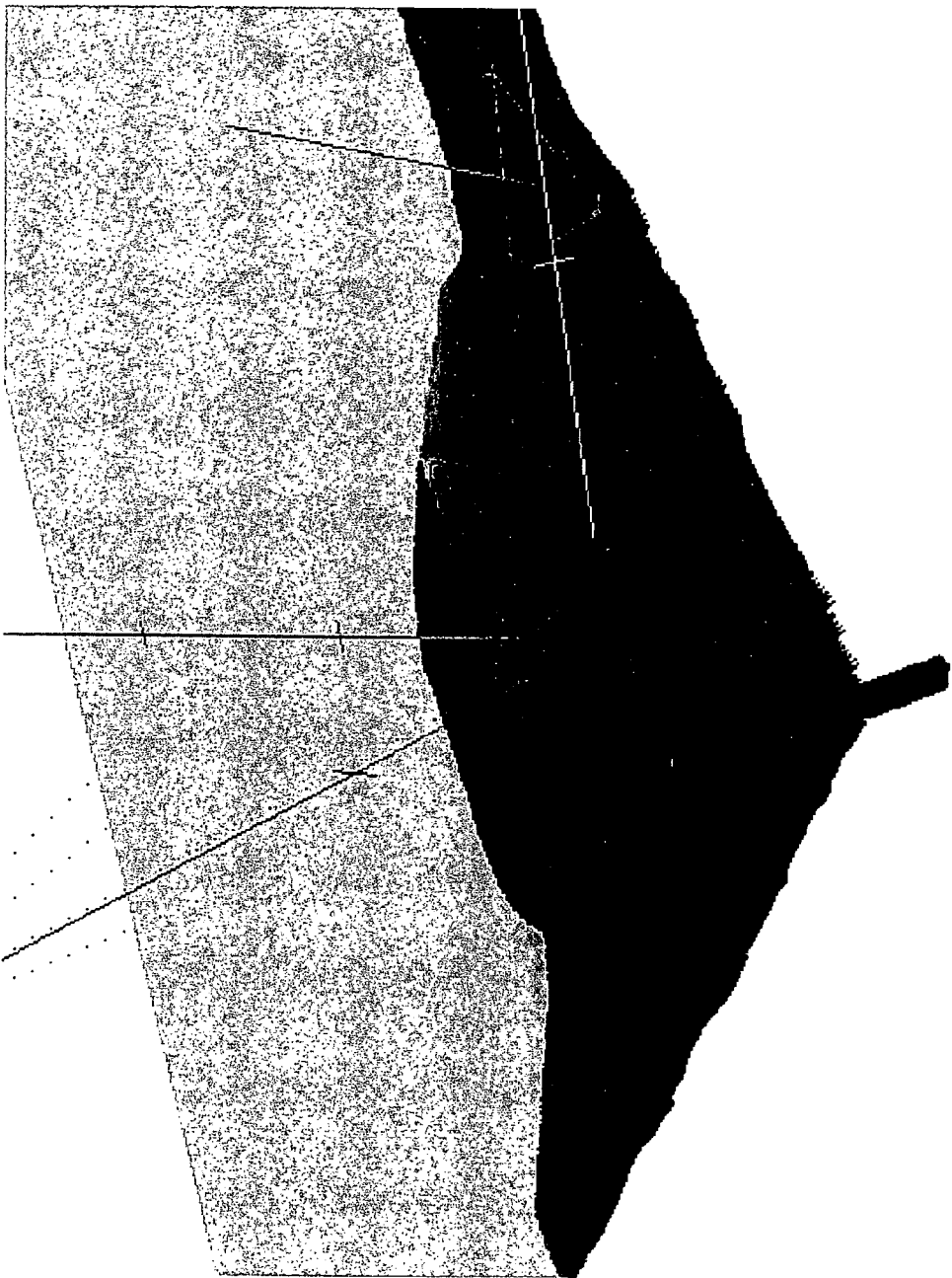
FIG. 21 shows an additional process step of obtaining volumetric measurements along the surface.

Collection of this data is eased by the fact that all vertex positions reflect the real-world vertex positions of the object, and thus the mesh is a 1:1 scale of the real object. All distance measurements along the surface of the object are taken from the object's vertex locations. All volumetric measurements along the surface are taken using the area formed by the triangles between vertices. FIG. 21 shows the utility.

Still another aspect that may be possible is registration and integration of multiple three-dimensional representations or renderings. Specifically, it is possible to obtain multiple three-dimensional representations or renderings of the same object, captured from different views, and merge them into one three-dimensional representation or rendering. This capability is known as registration and integration. One way to take advantage of data from the segmented image to efficiently register two representations is by locating corresponding panels. One advantage of using such data is that it provides a position-invariant view of the object due to the angular invariance of neighboring slopes.

Some possibilities for the present invention include reconstruction of surface geometry (three-dimensional) via constant phase contrast (which is typically constant for polarization), penetration of shadows via amplitude-independent (intensity-independent) processing, detection through scattering media. It is contemplated that spatial phase could be used in conjunction with any system to add discrimination ability. For example, spatial phase technology accordingly to the present invention can be effectively added to any sensor to expand that sensor capability to include phase information. Further, imaging data derived via the spatial phase technology accordingly to the present invention can be merged or fused with imaging data derived via other methods (e.g., regular imaging, infrared imaging) to provide an enhanced image.

Specific applications for the subject invention are numerous. Some applications are is the medical field (non-invasive glucose, ocular analysis for disease, etc., cancer (e.g., skin, breast, cervical, prostrate) diagnosis, and identification of DNA taggents and blood analytes. Other applications are to be found in industry, such as non-destructive inspections, 3-D profiling, telecommunications, remote sensing, and process control. For example, crystal growth can be monitored in real-time to immediately provide information regarding imperfections. Licensed government use could include weapons testing, and enemy detection and observation.

Still further, the three-dimensional representation/rendering imaging ability that the present invention provides lends itself to a myriad of possibilities such as real-time contour display of a map or the like. The spatial phase ability of the present invention is also useful for feature extraction and classification. Such specific application could entail pattern recognition, image enhancement, and scene analysis. For example, movement of objects, people, or the like can be monitored via the use of a spatial-phase identification marker or tag.

As a specific example, the present invention is usable to identify specific items that are marked with predefined tags. Each tag provides for at least one certain spatial phase characteristic within the electromagnetic energy proceeding from the tag. The certain spatial phase characteristic is identifiable, and thus the tag provided on the item is identifiable. The item may be any item, such as a person, and the tag may have any suitable construction.

Still further, because the electromagnetic energy may be at any portion of the spectrum, the applications may utilize any medium of electromagnetic conveyance to an apparatus in accordance with the present invention. For example, air/space (e.g., wireless), wire, fiber optic cable, storage media, and the like are all suitable conveyance mediums.

From the above description of the invention, those skilled in the art will perceive improvements, changes and modifications. Such improvements, changes and modifications within the skill of the art are intended to be covered by the appended claims.

What is claimed:

1. An apparatus for information extraction from electromagnetic energy via multi-characteristic spatial geometry processing to determine three-dimensional aspects of an object from which the electromagnetic energy is proceeding, said apparatus including:
    means for receiving the electromagnetic energy, the received electromagnetic energy having a plurality of spatial phase characteristics;
    means for separating the plurality of spatial phase characteristics of the received electromagnetic energy;
    means for identifying spatially segregated portions of each of the plurality of spatial phase characteristics, with each spatially segregated portion of each of the plurality of spatial phase characteristics corresponding to a spatially segregated portion of each of the other of the plurality of spatial phase characteristics in a group;
    means for quantifying each segregated portion to provide a spatial phase metric of each segregated portion for providing a data map of the spatial phase metric of each separated spatial phase characteristic of the plurality of spatial phase characteristics; and
    means for processing the spatial phase metrics to determine surface contour information for each segregated portion of the data map;
    wherein the means for separating, the means for identifying, the means for quantifying, and the means for processing include the use of spectral components.

2. An apparatus for information extraction from electromagnetic energy via multi-characteristic spatial geometry processing, said apparatus including:
    means for receiving electromagnetic energy from an object, the received electromagnetic energy having a plurality of spatial phase characteristics, including at least one non-polarization spatial phase characteristic;
    means for separating the plurality of spatial phase characteristics of the received electromagnetic energy;
    means for identifying spatially segregated portions of each of the plurality of spatial phase characteristics, with each spatially segregated portion of each of the plurality of spatial phase characteristics corresponding to a spatially segregated portion of each of the other of the plurality of spatial phase characteristics in a group;
    means for quantifying each segregated portion to provide a spatial phase metric of each segregated portion for providing a data map of the spatial phase metric of each separated spatial phase characteristic of the plurality of spatial phase characteristics; and
    means for processing the data maps of the spatial phase metrics to determine characteristics of that object, including means for determining a surface profile of the object in three dimensions.

3. An apparatus as set forth in claim 2, wherein the means for processing includes means for determining object material type.

4. An apparatus as set forth in claim 2, wherein the means for processing includes means for determining object surface orientation.

5. An apparatus as set forth in claim 2, wherein the means for processing includes means for determining orientation of the molecular structures of the object.

6. An apparatus as set forth in claim 2, wherein the means for receiving, the means for separating, the means for identifying, and the means for quantifying include provide for the use of spectral content as the non-polarization spatial phase characteristic.

7. An apparatus as set forth in claim 2, wherein the means for receiving, the means for separating, the means for identifying, and the means for quantifying include provide for the use of intensity as the non-polarization spatial phase characteristic.

8. An apparatus as set forth in claim 2, wherein said means for providing a data map includes providing the map to indicate spatial phase change.

9. An apparatus as set forth in claim 2, wherein the electromagnetic energy conveying insufficient characterization in the visible and infrared spectrums to permit viable intensity-only based and/or frequency-only based usage.

10. An apparatus as set forth in claim 2, wherein said apparatus is a single view imaging apparatus for providing an image of an object as the source, and includes means for determining an imaging value associated with each group of corresponding segregated portions using the spatial phase metrics, and means for assembling a three-dimensional image representation or rendering of the object using the determined imaging values.

11. An apparatus as set forth in claim 10, wherein said means for assembling a three-dimensional image representation or rendering includes means for using determined values representative of slope functions of the object.

12. An apparatus as set forth in claim 10, wherein said means for assembling a three-dimensional image representation or rendering includes means for using determined values representative of surface shapes of the object.

13. An apparatus as set forth in claim 10, wherein said means for assembling a three-dimensional image representation or rendering includes means for using determined values representatives of surface contour of the object.

14. An apparatus as set forth in claim 2, wherein said apparatus is an imaging apparatus for providing an image of an object as the source, and includes means for determining an imaging value associated with each group of corresponding segregated portions using the spatial phase metrics and indicative of material composition of the object associated with each group of corresponding segregated portions, and means for assembling an image representation of the object indicative of material composition using the determined imaging values.

* * * * *